(12) United States Patent
Siddiqui

(10) Patent No.: US 9,674,663 B2
(45) Date of Patent: Jun. 6, 2017

(54) PROXIMITY-ENABLED DIGITAL GESTURE TRACKING

(71) Applicant: Qirfiraz Siddiqui, Castro Valley, CA (US)

(72) Inventor: Qirfiraz Siddiqui, Castro Valley, CA (US)

(73) Assignee: QIRFIRAZ A SIDDIQUI, Castro Valley, CA (US)

( * ) Notice: Subject to any disclaimer, the term of this patent is extended or adjusted under 35 U.S.C. 154(b) by 0 days.

(21) Appl. No.: 14/980,832

(22) Filed: Dec. 28, 2015

(65) Prior Publication Data

US 2016/0192143 A1 Jun. 30, 2016

Related U.S. Application Data

(60) Provisional application No. 62/098,353, filed on Dec. 31, 2014.

(51) Int. Cl.
| | |
|---|---|
| *H04W 24/00* | (2009.01) |
| *H04W 4/02* | (2009.01) |
| *H04W 4/00* | (2009.01) |
| *G06F 17/30* | (2006.01) |
| *G06F 3/01* | (2006.01) |
| *G06Q 50/00* | (2012.01) |
| *H04L 29/08* | (2006.01) |

(52) U.S. Cl.
CPC ............ *H04W 4/023* (2013.01); *G06F 3/017* (2013.01); *G06F 17/3087* (2013.01); *G06Q 50/01* (2013.01); *H04L 67/18* (2013.01); *H04W 4/008* (2013.01)

(58) Field of Classification Search
CPC ............. G06F 21/84; G06F 2221/2111; G06F 2221/032; G06F 21/629; G06F 13/00; G06F 3/011; G06F 3/04842; G06F 3/0488; G06F 3/017; G06F 17/3087; H04W 88/02; H04W 12/02; H04W 12/08; H04W 4/023; H04W 4/206; H04W 4/08; G06Q 10/109; G06Q 30/0631; G06Q 50/01; H04M 1/72572; H04M 3/42; H04L 63/107; H04L 67/22; H04L 67/1095; H04L 29/08; H04L 67/02; H04L 51/32; H04L 67/18
USPC ................... 455/456.3; 725/43, 37; 345/173
See application file for complete search history.

(56) References Cited

U.S. PATENT DOCUMENTS

| | | | |
|---|---|---|---|
| 8,884,874 B1 * | 11/2014 | Kim | G06F 3/017 345/156 |
| 9,253,631 B1 * | 2/2016 | White | H04M 1/72572 |
| 2009/0178011 A1 * | 7/2009 | Ording | G06F 3/04883 715/863 |
| 2013/0042296 A1 * | 2/2013 | Hastings | G06F 21/10 726/1 |

(Continued)

*Primary Examiner* — Mahendra Patel
(74) *Attorney, Agent, or Firm* — Kamran Emdadi

(57) ABSTRACT

Online social networking and user posts may be associated with a user profile managed by a particular online application or website. One example method of operating may include identifying a digital gesture received from a user device, receiving a digital gesture confirmation based on at least one of current location and a previous location between the user device and a target location associated with the digital gesture, applying a weight to the digital gesture based on the digital gesture confirmation, and storing the digital gesture as a weighted function of the applied weight.

14 Claims, 10 Drawing Sheets

(56) References Cited

U.S. PATENT DOCUMENTS

| | | | |
|---|---|---|---|
| 2013/0110804 A1* | 5/2013 | Davis | G06F 17/30967 707/706 |
| 2013/0203442 A1* | 8/2013 | LeBlanc | G06Q 10/109 455/456.3 |
| 2013/0314341 A1* | 11/2013 | Lee | G06F 3/0488 345/173 |
| 2013/0331184 A1* | 12/2013 | Kelly | G07F 17/3211 463/31 |
| 2014/0188989 A1* | 7/2014 | Stekkelpak | H04L 67/02 709/204 |
| 2014/0214628 A1* | 7/2014 | Argue | G06Q 30/0643 705/27.1 |
| 2014/0289667 A1* | 9/2014 | Van Vliembergen | G06F 3/04842 715/781 |
| 2014/0364056 A1* | 12/2014 | Belk | H04B 5/0031 455/41.1 |
| 2015/0040035 A1* | 2/2015 | Neelakant | H04L 51/32 715/753 |
| 2015/0269936 A1* | 9/2015 | Alameh | G10L 15/26 704/235 |
| 2016/0195926 A1* | 7/2016 | Imoto | G06F 3/012 382/103 |

\* cited by examiner

PROXIMITY-ENABLED DIGITAL GESTURE TRACKING

CROSS-REFERENCE TO RELATED APPLICATION

This application claims the benefit of U.S. Provisional Patent Application No. 62/098,353, filed on Dec. 31, 2014 and entitled PROXIMITY-ENABLED, ENHANCED DIGITAL GESTURES. The subject matter of this application is hereby incorporated by reference herein in its entirety.

TECHNICAL FIELD OF THE APPLICATION

This application relates to identifying digital gestures, such as those commonly associated with social networking, and more particularly, to identifying and tracking digital gestures based on various parameters to quantify/weight the digital gesture accordingly for credit and status reasons.

BACKGROUND OF THE APPLICATION

The world wide web has made earth, a very connected place, in which physical location of a person has become less important. Still, many digital services (advertisements, etc.) are performed using location-dependent content which enhances the utility of service (e.g., localized advertisements). On the other hand, Digital gestures do not use any location information. For example, social media like FACEBOOK or TWITTER or GOOGLE+, extensively employ digital gestures and messages using buttons labelled "Follow", "Like", "Friend" or "Add", and by just a click of such a button, any person, on any part of our earth globe, can "Follow", "Like", "Friend" or "unFriend" another person on any other part of our earth globe.

Facebook's "Like", Google's "g+" and Twitter's "Follow" buttons are parts of our modern digital language. The purpose of these gestures/messages is to incorporate a new activity easily, with the single click of a mouse. However, this ease of incorporation has also reduced the value of these gestures/messages. For example, a "geek" may make hundreds of friends at Facebook, but in practical life this "geek" might actually be a "loner", because the poor guy, never met any of his "friends".

Conventional digital gestures made in social networking and online blog sites commonly refer to a simple approval rating, such as "like" as in FACEBOOK, which has almost no meaning at all. Also, an approval rating between 1 and 5 stars is commonly associated with a weighted sum of postings of various users, however, star ratings can always be created blindly without user demonstration of actual first-hand knowledge or experience. For example, an online user profile might say great things and rank a restaurant with 5 start, however, the user has never visited that restaurant and may be in another country. Therefore, cross-referencing user posts with other known variables about the user profile, user device, etc., may provide an added degree of validity to the user postings and other digital gestures submitted by the user on various communication platforms/websites.

SUMMARY OF THE APPLICATION

One example embodiment may provide a method that includes identifying a digital gesture received from a user device, receiving a digital gesture confirmation based on at least one of current location and a previous location between the user device and a target location associated with the digital gesture, applying a weight to the digital gesture based on the digital gesture confirmation, and storing the digital gesture as a weighted function of the applied weight.

Another example embodiment may include an apparatus that includes a processor configured to identify a digital gesture received from a user device, and a receiver configured to receive a digital gesture confirmation based on at least one of current location and a previous location between the user device and a target location associated with the digital gesture, and the processor is further configured to apply a weight to the digital gesture based on the digital gesture confirmation, and store the digital gesture as a weighted function of the applied weight.

DETAILED DESCRIPTION OF THE APPLICATION

Figure 1:
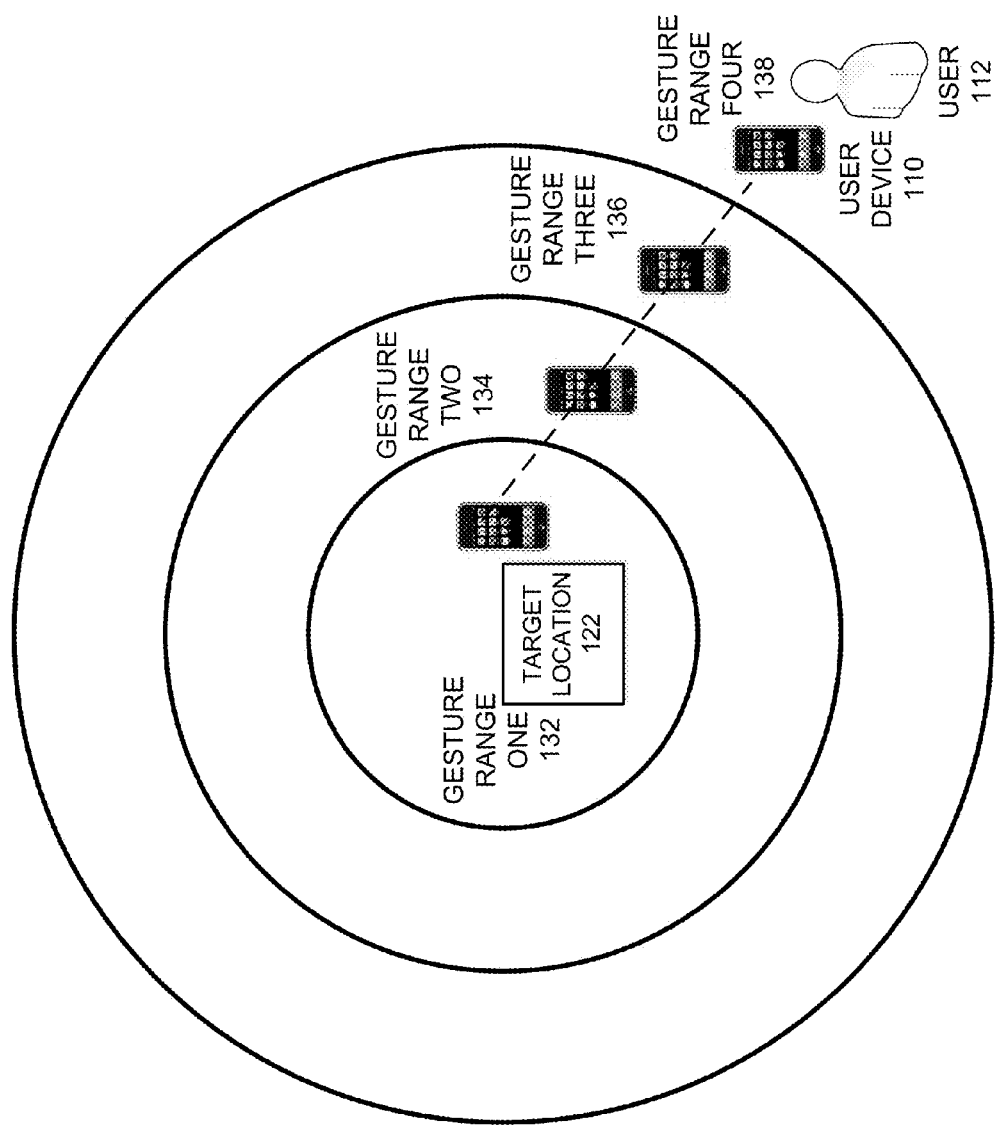
FIG. 1 illustrates a network configuration diagram according to an example embodiment of the present application.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

According to example embodiments, digital gestures performed by user-interfaces operating on smartphones, tablets, and other hand-held devices and computers may be identified and confirmed for proximity and a relative degree of relevancy. The measurement and inclusion of proximity and/or geo-location, may be used along with physical proximity variables (i.e., Boolean, Scalar and/or Vector) which are calculated/derived or authenticated by NFC, BLE, Zigbee, GPS, AGPS or any known protocols or configurations.

Validation of proximity of a user device can be used to gain the lost value of social media based gestures and messages. For example, if a person "Likes" another person by a "Tap" of NFC enabled phones then this "Face-to-Face", "Like" should be regarded as more valuable gesture than the "in-absentia Like" gesture performed by a click of a mouse. Similarly, a person can be followed on TWITTER or added to GOOGLE circles, by tapping NFC enabled phones.

Proximity technologies could be rated/weighted on the basis of a "Probability of Encounter". The tap used via an NFC device should be considered as sure evidence of an actual physical face-to-face encounter. Also, BLUETOOH low-energy (BLE) may be considered "immediate", and should be considered as a 90 percent probability of an actual encounter or above. Bigger distances, although still in BLE or Zigbee range, may mean less likelihood of an encounter and thus a "Like" in this level of proximity should have a weight calculated from signal strength.

According to example embodiments, a proximity enhanced gesture or proximity reliable gesture will be applied to an online company such as FACEBOOK. In one specific example, when two user devices operated by two respective users have a favorable encounter or even an unfavorable encounter, and one of the users selects a "Like" button on their phone while deliberately bringing their phone into close proximity with the other user's phone, such as in a close proximity, then this "Like" should be considered a "Face-to-Face Like" which is a new type of enhanced gesture, and should also be given a new name, e.g., "Fike" where "F" stands for "Face-to-Face". Obviously, this "Face-to-Face Like" or "Fike" will be performed through an application which should be a non-intrusive application. The "Fike" application would only increment a "highly-secure" Fike-counter on the user's phone. The user would also have the option to periodically update/publish this counter on user's account page on social media. For the purpose of privacy, each "Fike" encounter should remain completely anonymous and the "Fike" should not exchange any information between the phones but merely update a server of the encounter to include the location, the user profile of the first device, the user profile of the second device and any information corresponding to the actual Fike itself.

In one example, a report data file may be created that contains geo-coordinates and user profile information may be created and sent responsive to the Fike taking place. The information may be stored in the cloud as evidence of the "Fike" encounter and may be associated with any social network application utilizing the Fike function.

FIG. 1 illustrates a network configuration diagram according to an example embodiment of the present application. Referring to FIG. 1, the example proximity grid 100 includes various zones which contribute to a digital gesture score. For example, the gesture range of the area within a small predefined range of the target location 122 may be identified as gesture range one 132. The user device 110 of the user 112 may receive a weighted score that is based on the distance to the target location 122, which may include a business location, a person identified via a mobile device location technique (e.g., GPS, triangulation, IP address, etc.). The target location may also be an target location 122, such as a live terminal that accepts low energy near field wireless communication gestures. For example, the "like" or "fike" initiated by the user 112 at a NFC interface of the access point of another user, a business location, etc. may be afforded a full weight score since the proximity is actually 10 feet or less or is indicative of an actual face-to-face communication as evidenced by a NFC touch gesture which was identified and logged by a remote server.

The other examples of the range include a gesture range two 134 which provides a weighted score of 0.6 or 40 percent less than the original score of the face-to-face communication. The gesture range 134 may be identified by location based services which indicate that the distance to the access point is no greater than "X" number of feet. In one example, gesture range 134 may be 500 feet or less, gesture range three may be 2000 feet or less and gesture range 138 may be greater than 200 feet. The weights for 132, 134, 136 and 138 may be 1.0, 0.6, 0.4 and 0.2, respectively. This weighting function would apply a weight to lessen the impact of a like or comment made about a particular person or establishment as identified by the target location 122.

The Fike application may be accessed and incorporated into any online networking application, such as a social network application or a blogging application. In operation, a user downloads the "Fike" application and installs it on the NFC capable hand-held device. In the case of user-to-user encounters, when two persons having two respective computing devices, have a favorable encounter, and they agree to add to each other's "Fike" score, then they start the application on their personal devices. The application will demonstrate a "Face-to-Face Like" button (see FIG. 3A) and corresponding information on a graphical user interface as part of its first screen.

Both users of the user device may then select the "Face-to-Face Like" button on their own phones, however, one selection per multiple users may suffice as the application will identify the parties to the Fike action regardless. When the "Face-to-Face Like" button is selected on each phone, the next interface of FIG. 3B will appear, which illustrates a count-down timer 308 in digital or analog format. A message is also displayed along the timer, saying that "You have 5 or 10 seconds to authenticate this "Like", by touching the NFC capable devices. When the two devices touch each other, they exchange NFC data exchange format (NDEF) messages between them, and on one or both phones, a message is displayed that the Fike was successful 310. After this encounter, on each device, a secure "Fike-counter" 312 is incremented to indicate the session was successful. The applications in both devices will then increment another secure, in-memory counter, for the location, on which these two persons have just "Fiked" each other. This will be performed by adding longitude-latitude of this location into an on-cloud database as provided by the GPS on the devices.

Figure 2:
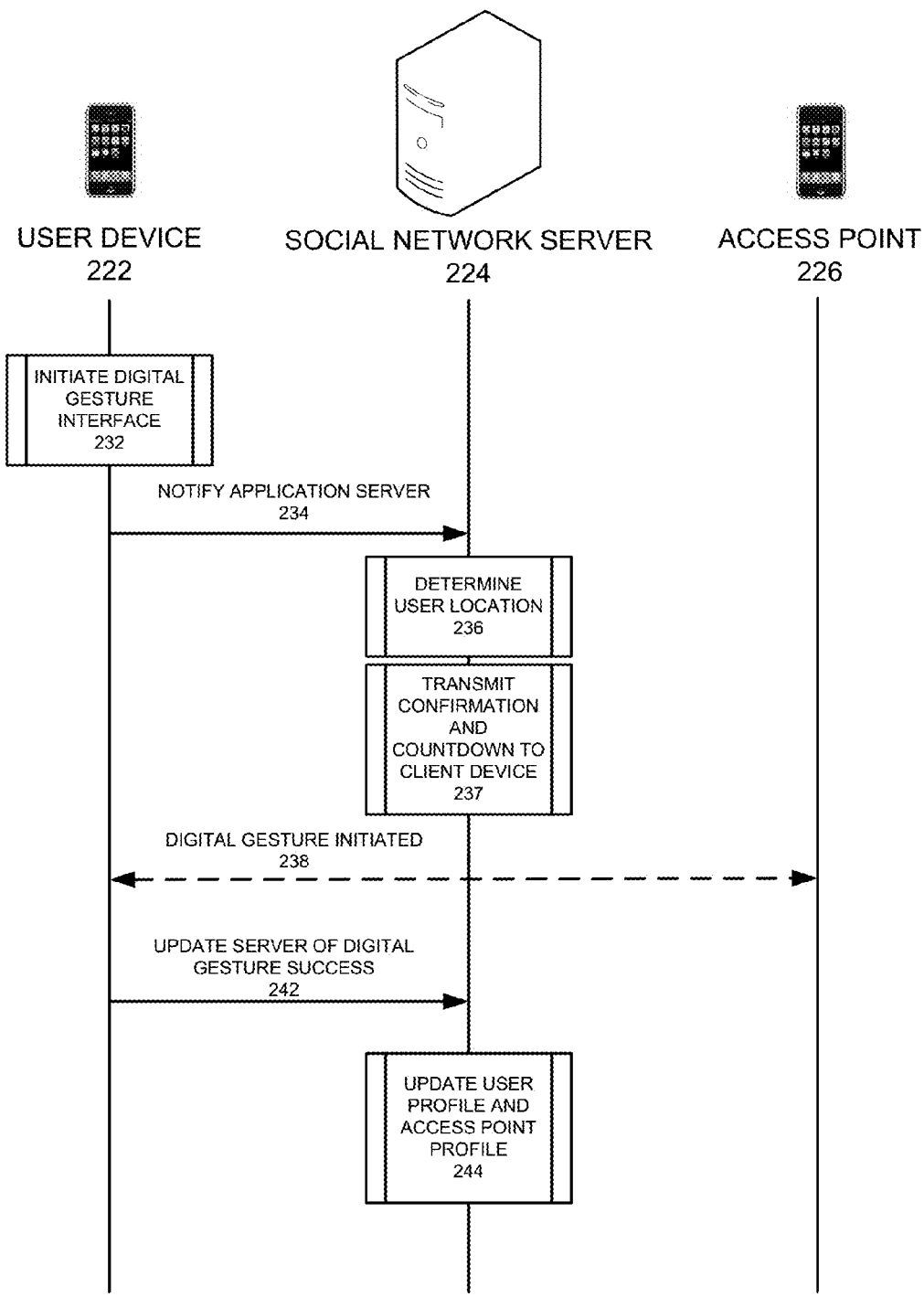
FIG. 2 illustrates a system communication diagram of a data communication between a user device and a digital gesture access point according to an example embodiment of the present application.

FIG. 2 illustrates a system communication diagram of a data communication between a user device and a digital gesture access point according to an example embodiment of the present application. Referring to FIG. 2, the system 200 includes a user device 222 which is in communication with a social network server 224 or other website server. The user device 222 may be attempting to communicate with an access point 226, which may be a kiosk at a particular business, another user device of another user, or any other device capable of identifying the user device 222 as being present during a fike encounter or communication session. In operation, the user device 222 may initiate a gesture interface 232 in lieu of making a gesture with another access point 226. The application initiation operation may create a notification that is automatically created and transmitted 234 to the server 224. The server may then identify the user profile of the user device 222 and determine a present user location 236 based on GPS. The server may then transmit a confirmation to the user device an initiate a countdown timer on the user device 237 that requires the user to initiate communication with the access point selected. The digital gesture may then be performed between the user device 222 and the access point 236. Upon the gesture being recognized, the server is updated and the digital gesture is saved and stored in the server as part of the user profile as a success 242. The profile is updated to reflect the status, points and any other criteria 244.

Figure 3A:
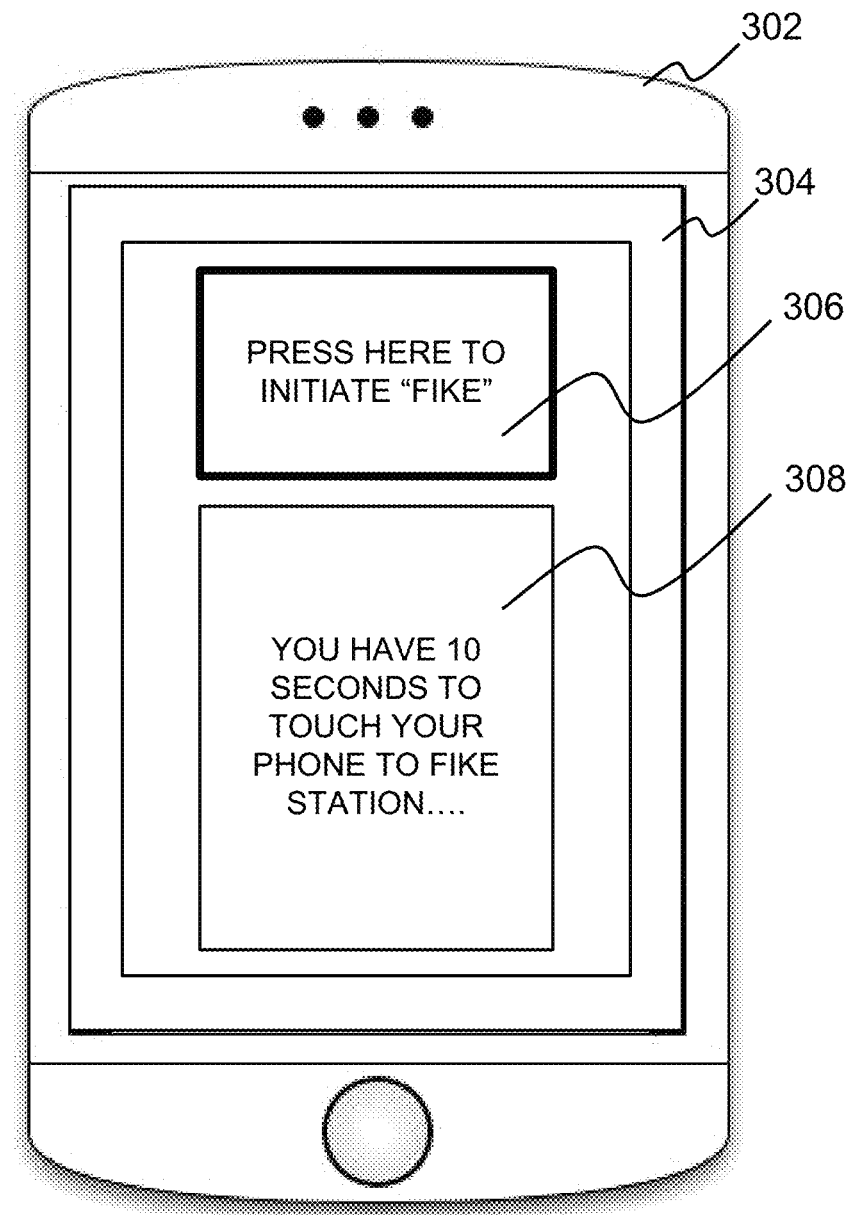
FIG. 3A illustrates a user interface of a digital gesture initiation procedure according to an example embodiment of the present application.

FIG. 3A illustrates a user interface of a digital gesture initiation procedure according to an example embodiment of the present application. Referring to FIG. 3A, when the user initiates the Fike function, the device 302 provides an interface 304 with a button 306 that can be pressed to initiate communication with the server and to initiate a timer as illustrated in the interface 308.

Figure 3B:
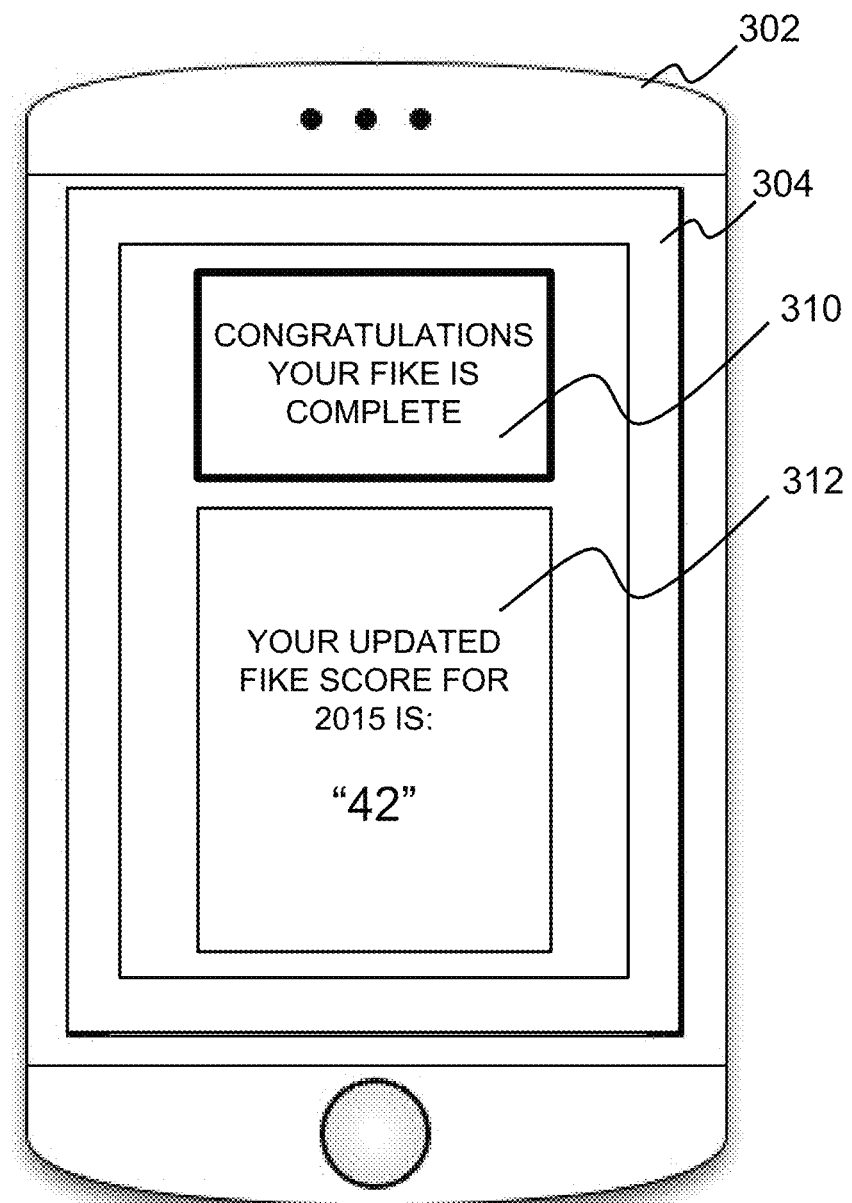
FIG. 3B illustrates a user interface of a digital gesture completion procedure according to an example embodiment of the present application.

FIG. 3B illustrates a user interface of a digital gesture completion procedure according to an example embodiment of the present application. Referring to FIG. 3B, the device 302 includes an updated interface with a confirmation 310 and an indication with an updated Fike score 312 to illustrate the user's Fike score for a predetermined period of time.

Figure 4:
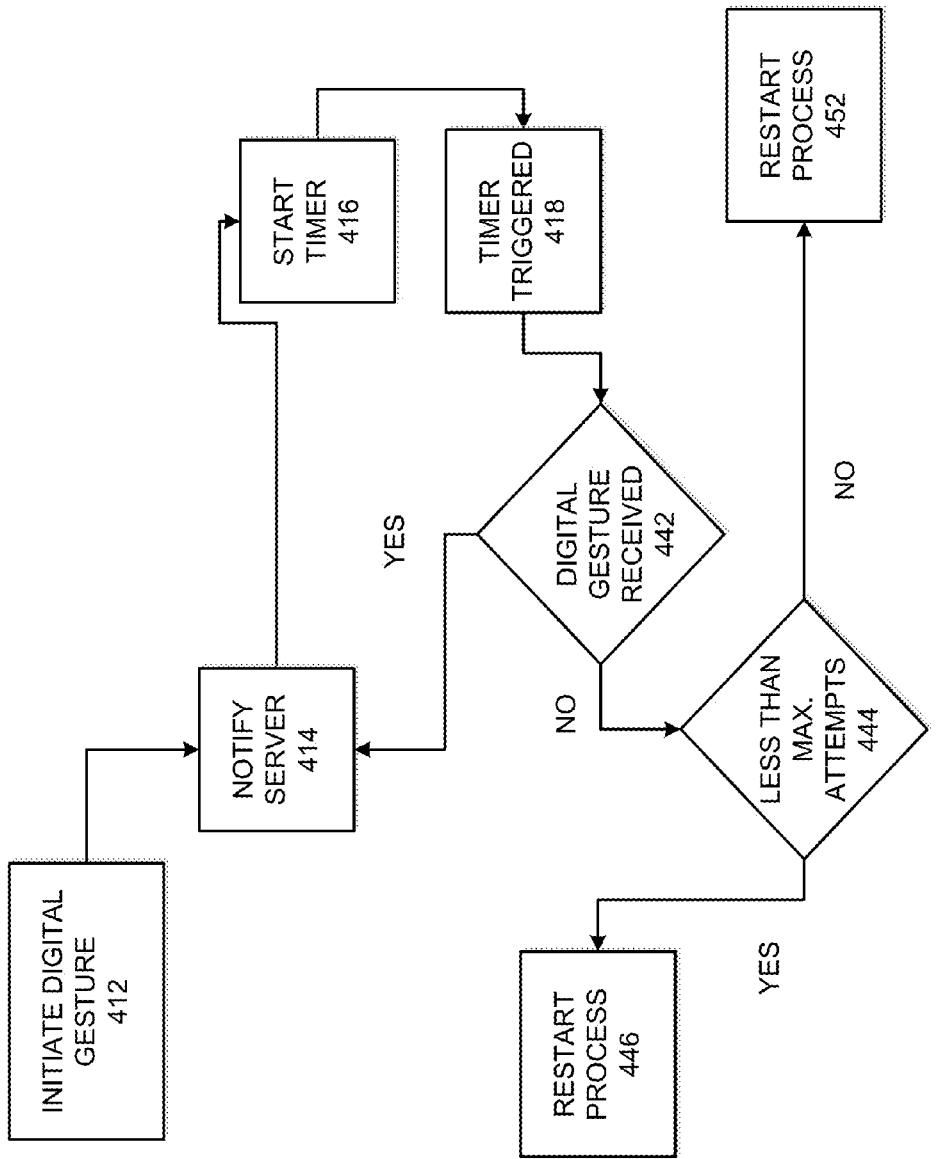
FIG. 4 illustrates a logic flow diagram of a digital gesture initiation procedure according to an example embodiment of the present application.

FIG. 4 illustrates a logic flow diagram of a digital gesture initiation procedure according to an example embodiment of the present application. Referring to FIG. 4, the logic example 400 includes various operations conducted during a digital gesture procedure including the initiation of the procedure 412, a server notification being created and sent 414 responsive to the procedure being initiated, a timer being started 416 to create a limited window of opportunity to perform the Fike operation. Once the timer is triggered 418, the digital gesture must be received 442 and if so then the server is notified. If not, then an attempt counter 444 may be used to ensure the user has had an ample opportunity to perform the Fike function, the process can then be restarted 446/452 regardless of the status.

Figure 5:
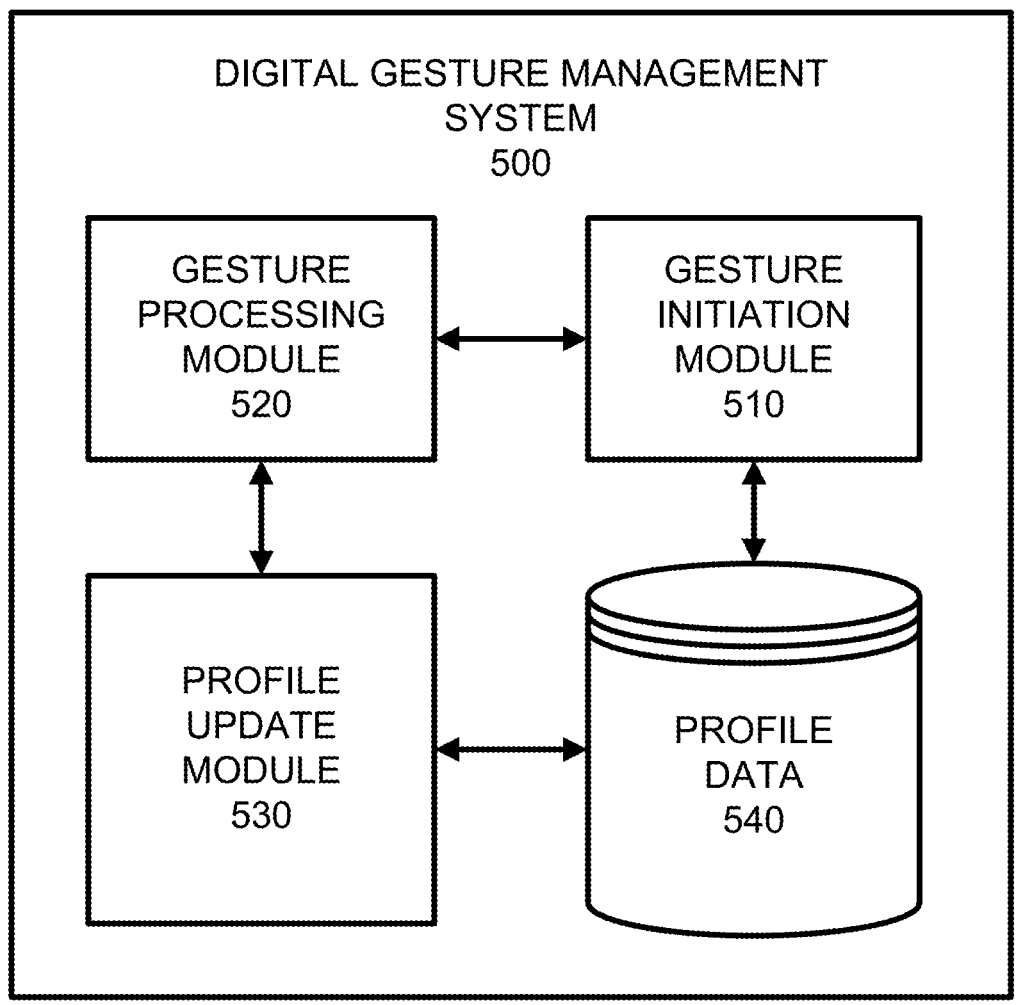
FIG. 5 illustrates a system configuration configured to perform one or more of the example embodiments of the present application.

FIG. 5 illustrates a system configuration configured to perform one or more of the example embodiments of the present application. Referring to FIG. 5, the system 500 may include a single device or multiple devices which together perform the operations of the digital gesture examples described in this disclosure. For example, the gesture initiation module 510 may receive a gesture initiation message triggered by a user initiating a user device. The gesture processing module 520 may then process the gesture input received to identify if the gesture is accurate. The changes are logged and updated via the update module 530 to be stored in the profile databank 540.

According to additional embodiment, the actual locations of Fike encounters may be identified and plotted automatically to create a fike map or world map of happiness. This can be used to automatically identify less fortunate areas of the world and the areas which are the most happy. This may lead to popularization of a global variable, which can be appropriately named as a "Happiness Index" (HI). The world tourist destinations could then compete for a higher "Happiness Index" or "HI", and people would plan their vacations accordingly.

According to another example embodiment, proximity as an analog variable (scalar) may be measured by signal strength is a scalar variable measured as analog quantity. Accordingly, as signal strength changes based on the distance between transmitters and receivers alters. Such information could be available from all proximity determining technologies, including NFC, BLE, and Zigbee. If the signal strength is increasing with time, then the distance between the two devices receiver and transmitter are coming closer. This increasing change in signal strength may be translated differently in various contexts.

In one example, in a war strategy game nearness may mean vulnerability. In a social media context, this nearness may be translated as "Probability of encounter". Input from other sensors like accelerometer will further enhance the user experience and utility of the gesture. Directional antennas can simultaneously determine signal strength as well as the direction from which a signal is arriving. Combined with accelerometer and a digital compass, very fine details of a moving handheld device can be charted in 3 dimensions, and complex set of gestures can be built around this movement. As the measurement techniques become more precise, a whole digital language can be built around these gestures. Context will determine meanings of any gesture. For example, if a device is moved along X shape, then it may mean "The End" or "Closure" of something. In December, the same gesture may represent Christmas, while in social context, it may mean "Hugs".

According to another example embodiment, proximity may be used to identify user device location which in turn can be expression as a "collective-intent". This example may also be referred to as a "collective fike" or "C-Fike", for short. The "C" may also be taken to mean "celebrity" since celebrities will be the most likely beneficiaries of a "C-Fike". For example, during an election year in the USA. Currently, a presidential candidate hopeful, such as Hillary Clinton or Donald Trump, can receive an immediate "pledge of support" by inquiring from an audience in a public meeting to "Fike" him/her, using the "Fike-app" on their phones. In addition, the "C-Fike" could have a "many-to-one" gesture, which means, it could be directed to one "account" from many accounts. The target account or "celebrity-account" will increment by the number of sending accounts, while each sending account will be incremented by one for each transaction. The "celebrity-account" or "C-account" will have a longer period for which it can accept "public" fikes from a large number of sending accounts or "S-accounts" for short. The "C-Fike" may be implemented over BLUETOOTH or ZIGBEE networks, but for larger gatherings, WIFI, SMS or other similar communication technologies may be used.

A near field communication (NFC) implementation of "C-Fike" may require a network of "Fike-stations" and the public may then 'tap', 'shake', 'snap', etc., their phones to perform a "C-Fike". The "Fike-stations" may be connected to a celebrity account through wired or wireless connections. The celebrity may opt to publish the results of a "C-Fike", immediately or at a later time. As a variation of "C-Fike", the public user devices and user accounts may be sent a question to select different emoticons (MOJIS) or different values, so that a "C-Fike" becomes a way to share an "instant-opinion-poll" for approval, disapproval, or neutral opinion, on some proposal/idea/concept that is trending through the web, social media, live events, etc.

Other results for a particular FIKE or other action may include an authenticated social networking post or statement. Proximity technologies, such as GPS and/or NFC encounters/sessions or BLUETOOTH low energy (BLE) encounters/sessions may add an additional layer of solidification to the input provided. The FIKE could also be used as a new social gesture, representing a "digital kiss" OR "a digital handshake" OR just an "amiable meeting". In general, Fike represent a Face-to-Face, proximity-authenticated, digital gesture to record a "Favorable Encounter" while combining the certification or approval of a FACEBOOK LIKE. The BLE based 'IBEACON' on APPLE devices has clearly defined proximity levels, such as "FAR", "NEAR", and "IMMEDIATE" which can provide "weight" to a "FIKE" gesture. For instance, a "FAR" determination made via the mobile device near presence antenna could weigh the FIKE as having a rating of 1-3, the "NEAR" rating weight the FIKE to have a rating of 3-6 and the "IMMEDIATE" presence of the near presence antenna could weigh the FIKE to have a rating of 6-10, and the 10 could be the maximum weight which makes the FIKE more reliable and offers an overall rating of up to 10 times a value that is related to a FIKE made by a user device at a far distance away.

FIKES performed by the user devices may also have a particular designation, such as a business relationship (suitetie), formal relationship (shake hands), a casual relationship (waving-hands, hi, bye), eye contacts (just looking & appreciating), intimate (holding hands), physically intimate (holding by waste, sitting together), very intimate (hugging), romantic (touching faces), physically romantic (kissing), extremely intimate (adult only designation). The "FIKE-emoticons" may have the potential of becoming a "social game" as well. For example, a salesperson may boast how many "Business Fike-itons", he has collected, which leads to more business, and a film actress's popularity can be measured with her on-screen "Romantic Fike-itons", which could lead to more downloads and online access attempts.

Another aspect of FIKE-number algorithm is that when a user downloads the application to incorporate FIKE into his or her social networking activities, his or her initial FIKE-score is randomly selected between 10 to 200 or so. The concept is that everybody comes face-to-face with other people, and some of these encounters are definitely favorable (LIKEable) encounters. That means everybody is "Fiked" by somebody because FIKE is a "face-to-face" "LIKE". So nobody should start with a "ZERO" fike-score.

One rule that may be utilized for the fike counting or accrual of fike gestures may provide that no device is permitted to "Fike" indefinitely. There may be a minimum period of time, such as 10 minutes, 30 minutes, 8 hours, 24 hours, one week, one month or so, between two subsequent fikes by a single user profile. A user device and use profile will become ready for the next fike, only after the period of has lapsed since the previous fike. In the example of the celebrity or prominent figure fike, such as a C-fike, this period could also be defined and may be longer or shorter depending on the goal of the application.

A 'Fike-count' for celebrities or other prominent locations, political figures, etc. will also be allotted an initial number, which will be calculated by considering an existing metric of the celebrity status, plus a proportional weighted random number. This may be a combination of existing social media (FACEBOOK, TWITTER, GOOGLE+, etc.) followings, net yearly income, record sales, global popularity, etc. A location-wise fike-count may utilize an algorithm to calculate some realistic initial value for the initial fike-number, which will also serve as the weighting factor for future fikes. For example, the United Nations defines a human development index (HDI) plus other socio-economic indices, which may provide an initial value. For example, for major tourist destinations, such as San Francisco, Cape Town, or Venice, some existing measure of well-being or happiness/development index, will be used as an initial fike count. Cloud-based back-end processing of data input and digital gestures, will also be used to determine resulting fike-counts. A single fike in San Francisco will carry a different weight then "a single" fike in Timbuktu which has different socio-economic characteristics, and hence will have a different pre-assigned weight for a "single fike". Also, 'Fike-counts' for celebrities, and tourist destinations will have the potential for real-time data, available for end user through newspapers or media channels, hence the data adjustment/weighting will have to be performed as back-end processing.

Those user profiles associated with fikes, may be referred to as 'Fikers' may pass an "emoticon" to identify a "type" of the fike. In one specific example, a business manager may be identified within an organization as the employee of the year due to a fike score or count. This could be calculated based on a fike-score in a first half of a calendar year. In this example, the "Fike-count" can be used to measure productivity and effectiveness of public-dealing professionals based on their encounters and social network follow-up participants. The business cards could offer details of the user's social network information so clients and affiliates could comment and add to that user's fan base. Also, the aggregated "Fike-counts" of a location can be used for "real-estate" valuation, such as school ratings and crime-rates, which are currently identified by users for personal considerations.

According to another example embodiment, the fike feature may be used in a multi-player educational game for teenagers. In operation, two communicating devices can be brought into a close proximity that they slightly touch or 'tap' each other in order to communicate. This is evident with BLE and NFC communication platforms. This "Tap" is often referred to as a "digital kiss". Young mobile device users may perform a 'Fike-Teen' game that utilizes this "digital Kiss" with an aim to educate teenagers to distinguish between "right" and "wrong", in their evolving love lives. Through interactive game play, in a multi-player, nfc-enabled, role-playing game setting, teenagers will be apprised of the dangers of teen pregnancies, sexually transmitted diseases and other intimacy concerns prior to adult maturation. A player's role in the game is determined by the patterns of "fike" characteristics during a specified length of time. Each fike record may comprise the following fields: registered username (anonymous, available as an option), geo-location of a fike event. A fike-type (celebrity, teen, game, etc.), proximity range (far, near, or immediate), emoticon shared, if any, "Fike" recording application unique ID, etc.

Fike counts will be incremented and recorded on the user's mobile device. Users may decide to post fike data to their social media, whenever desired. A NFC "tap" will be the only way users can interact with a game, and the features will adjust their role as a per-fike characteristic. The user will enter a username and password once when they register or login, after that the game will be played totally through NFC "taps". The timings and other characteristics of a fike sequence will guide the course of the game. For example, an untimely "fike" may make the teen's phone pregnant, by putting a protruding belly on the home screen which is something to be avoided. A "Fike" gesture should always carry the aura of a "digital kiss" or a "more favorable encounter". No device is permitted to "Fike" indefinitely. There should be a minimum period of 30 minutes, or so, between two subsequent fikes. A device will become ready for the next fike, only after that period of time has lapsed.

According to another example, social media integration of fike data may offer an additional function of the digital kiss fike game. In the game scenario, most of the fike data will be processed locally on player's device, because there will be only one player per device, and a player's profile will be securely stored on a device. The game can be played through selecting a time/place for the fike-event (e.g., a social event, a class session, etc.). Game fikes will be considered as single fikes and will be stored in the cloud-based database, anonymously, without having any personal details of the player, even without a username or user profile. This configuration of the fike game may include only three specific parameters which are identified and uploaded to a cloud computing environment, such as a geo-location of a fike event, a proximity range (e.g., far, near, or immediate), and a fike-recording application unique identifier (ID). The fike-recording application unique ID, will be used to acquire application usage analytics, which can further identify the population groups, from where "fikes" are being generated. Back-end processing may be used to calculate plausible initial values and apply appropriate weights to fike counts so that a value of 'fike-density' (i.e., fikes per square kilometer per day) can be estimated for each point of location on a map. Once the back-end, cloud based, database is sufficiently populated, the importance of calculated initial values and subsequently applied weights may be disregarded and it is possible to calculate fike-densities on the basis of factual data.

Throughout the Fike-teen game, players will be rewarded with buttons and appreciation tokens etc., depicting successful completion of different stages of the game. The players can also be able to post an aggregated fike-score on their social media homepage, as evidence of their 'proximity-authenticated' popularity or just to advertise their 'proven-to-have-happened activities. User-adoption will be important for a group of cloud-based databases, and teenager involvement can be gained by making this game a fun activity by using graphics and animations and providing personally selectable customizable content. Local communication technologies, such as NFC can enable NFC-based games, such as 'Fike-Teen.' The tap can be popularized as a "digital kiss", and once people become comfortable with this harmless tap gesture, then users can also use this new gesture for payments based on the harmless gesture.

FIG. 5 illustrates a digital gesture management system 500 according to example embodiments. Referring to FIG. 5, the system 500 may represent a standalone computer, a group of computers on a network, in the cloud or in communication via any medium known to one skilled in the art which operate to perform the various operations, procedures, methods and related functions of the present application and the software application described throughout the disclosure. Referring to FIG. 5, the gesture initiation module 510 may be a transmitter/receiver that receives updates to new digital gestures that are performed, the locations of the gestures and distances associated with the gestures and stores the information in memory 540 and forwards the information for processing 520. The updated information may be identified and stored in memory via the user profile update module 530.

In one specific example embodiment, a method may include identifying a digital gesture received from a user device. The digital gesture may be a favorable gesture, an unfavorable gesture, or any type of digital gesture including a social networking acceptance or affirmation, such as a FACEBOOK LIKE, a comment, a post, etc. A remote server may identify the user device performing the gesture, a user profile associated with an online social network account and/or other user specific information associated with the user device. The digital gesture may be a separate message or part of a larger message included in a digital gesture confirmation. In this example, the digital gesture is paired with a particular location certification which may include a current user device location, a past user device location and/or a particular time associated with the location. For example, a user device may be identified as having been at a particular location, having been in close communication (NFC tap) with another user device, etc., within a predefined time period, 1 hour, 2 hours, 12 hours, 24 hours. Once the predefined time period has expired the device may not be able to provide the same level of digital gesture confirmation, however, the confirmation may be valid if received within that particular time period in which case the digital gesture confirmation can receive an elevated weight or maximum weight which is then recorded. The method may also include receiving the digital gesture confirmation based on a current location and/or a previous location between the user device and a target location associated with the digital gesture. As a result, a weight is applied to the digital gesture based on the digital gesture confirmation, and the digital gesture is stored as a weighted function of the applied weight. The digital gesture confirmation can also include a near field communication session confirmation and a geographical proximity confirmation between the user device and the target location.

Continuing with the same example, the method may also include receiving a radio transmitted signal at a digital gesture reception terminal that may include a receiver, and where the radio transmitted signal includes the digital gesture. The radio transmitted signal can include at least one of a Bluetooth low energy (BLE) signal, a near field communication (NFC) signal, a WIFI communication signal, a ZIBGEE communication signal and a short message service (SMS) signal. The procedure for applying a weight to the digital gesture based on the digital gesture confirmation can include applying a minimum weight to the digital gesture confirmation when a user device location is more than a threshold distance away from the target location. For example, in the illustration of FIG. 1, the various gesture range areas may be measured distances any of which include a customized weight associated with the distance. For instance when the distance is near the target and can be identified via a NFC communication session (tap), then the weight may be a maximum weight applied to the digital gesture. As the next distance is identified as the mobile device location, the weight may be reduced to a next level weight and again for the next gesture range and in the last gesture range a minimum weight can be applied. In summary, each gesture range can have its own weight applied to the digital gesture session.

Figure 6A:
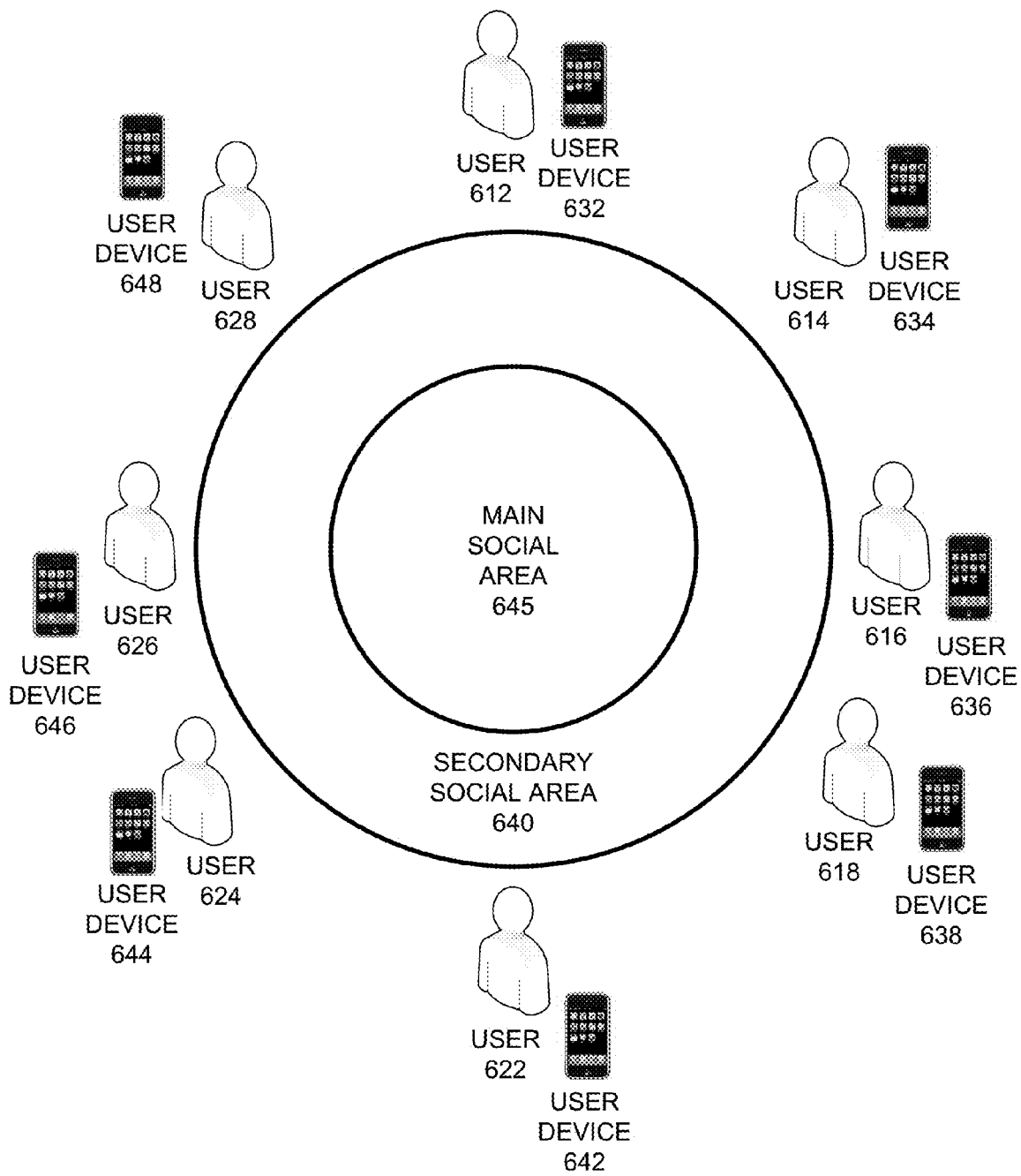
FIG. 6A illustrates a multiple user social interaction configuration prior to an activity commencement according to example embodiments.

FIG. 6A illustrates a multiple user social interaction configuration 600 prior to an activity commencement according to example embodiments. Referring to FIG. 6A, the various users devices 632, 634, 636, 638, 642, 644, 646 and 648 are paired with the various users 612, 614, 616, 618, 622, 624, 626 and 628, respectively. The users may be affiliated with certain online profiles which are used to track the users during a predetermined activity, such as a social interaction (e.g., networking function, teenager game, etc.). The game or activity may have a predetermined time limit and may track the number of digital gestures performed according to their distances away from one another as certified by distance tracking and/or near field communication signaling. The main social area 645 may be an intimately close environment requiring NFC tap sessions to certify the activity and the secondary social area 640 may be larger distance identified by GPS, or other position location procedures.

Figure 6B:
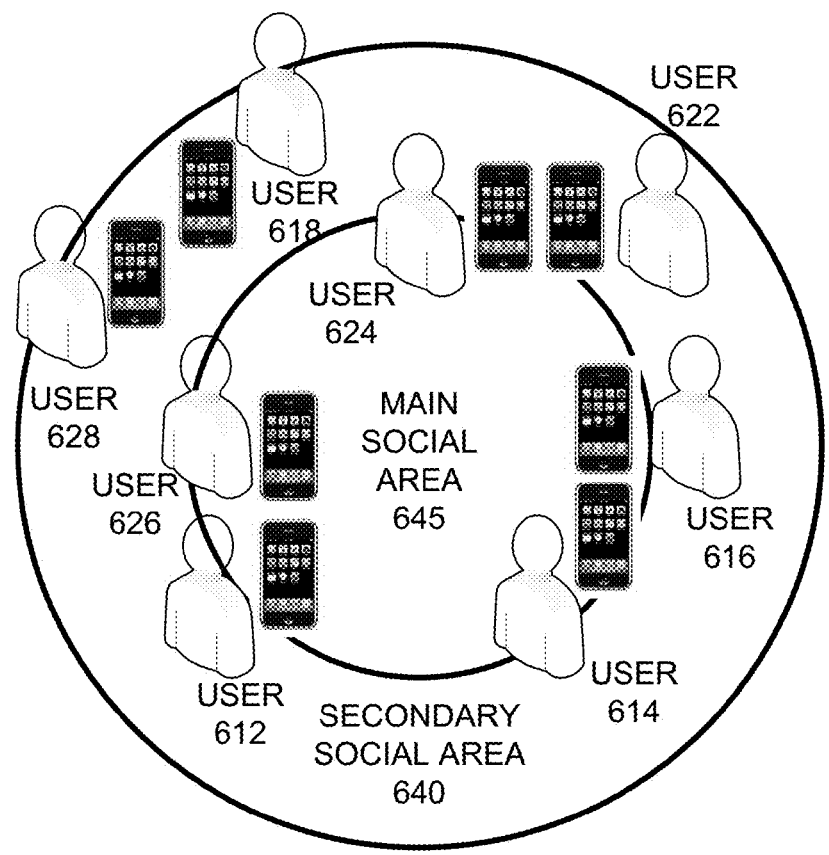
FIG. 6B illustrates the multiple user social interaction activity commencing according to example embodiments.

FIG. 6B illustrates the multiple user social interaction activity commencing according to example embodiments. Referring to FIG. 6B, the social interaction 650 has commenced and the various users have entered the main social area and/or the secondary social area 640. Users can certify they have made contact with other users by performing NFC enabled communication sessions (NFC taps) within the main social area 645. Users who may have engaged other users outside the main area may be considered to have entered a secondary social area 640 which may be identified by a non-active NFC presence of identifying a NFC ready device nearby but not initiating an actual NFC tap session and/or other location determination procedures. At the end of the predetermined period of time, the users may be credited with having made so many interactions and the most interacted or 'fiked' user may receive an award.

One example method of operation may include identifying a plurality of user profiles registered to participate in a time constrained activity at a remote server and receiving a plurality of digital gestures from a plurality of user devices associated with the plurality of user profiles within the time constrained activity. The method may also include retrieving content to share with at least one of the user profiles based on at least one of a number of digital gestures associated with the at least one user profile and a type of digital gesture associated with the at least one user profile, and transmitting the content to a mobile device associated with the at least one user profile. The content may include shared information from one user profile to another, a common interest discussed between the users as identified by a user device microphone or other detection peripheral of the user device such as a camera or scanning sensor. The plurality of digital gestures may include a plurality of near field communication sessions between at least two of the plurality of user devices.

Figure 6C:
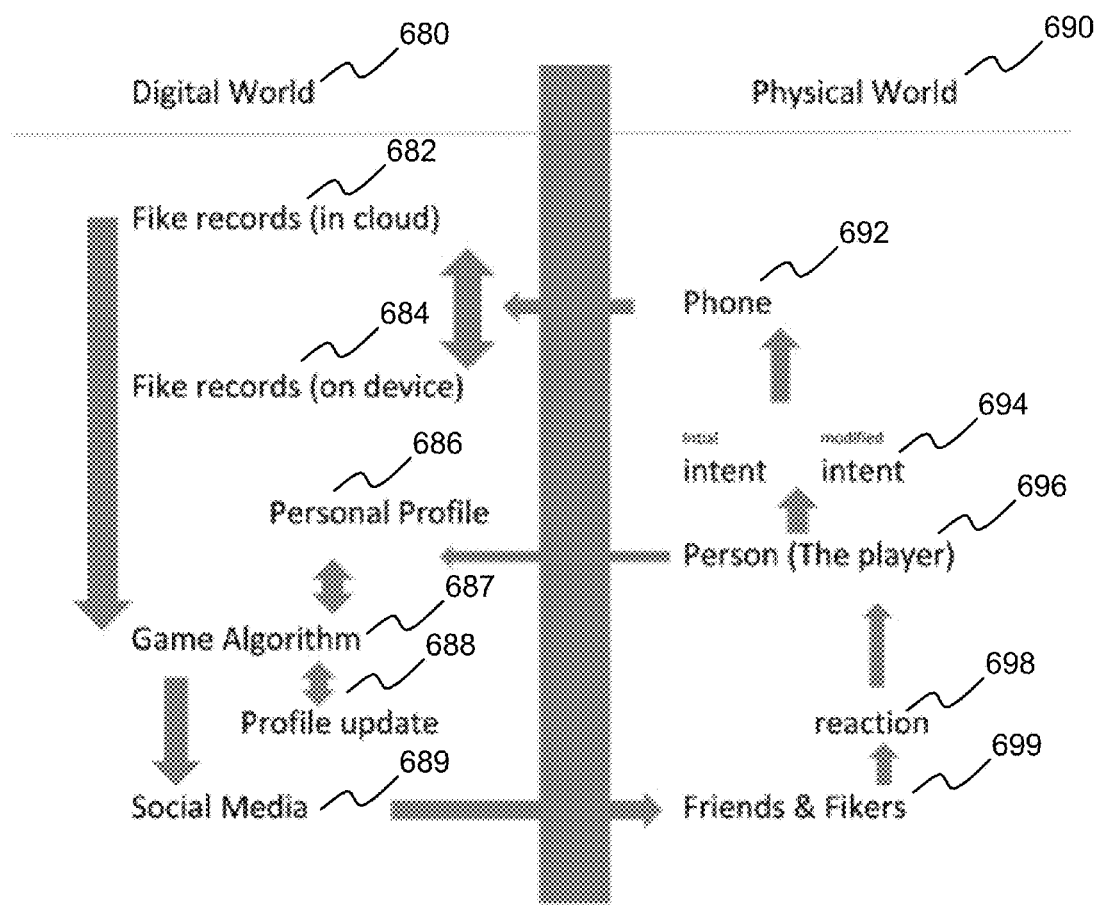
FIG. 6C illustrates a digital and physical model comparison of user access and participation in a digital gesture configuration according to example embodiments.

FIG. 6C illustrates a digital and physical model comparison of user access and participation in a digital gesture configuration according to example embodiments. Referring to FIG. 6C, the diagram 670 includes a digital world 680 paralleled by a physical world 690. In this example, the fike records 682 may be stored in the cloud as received from a device 684 associated with a personal profile 686. The physical world would only have a phone or other device 692 accessed by a user to identify the user profile and ongoing activities related to the fike feature. This may include the initial intent and the modified intent 694 of the person 696. The game algorithm 687 may include certain profile updates 688 from social media 689. The physical world 690 may incorporate reactions 698 from friends and fike users 'fikers' 699 Teenage last seven years (13 to 19).

In one example, a 'fike-teen' game may include one day equaling one week of real life. So an entire whole 7 year period of a "virtual teenage" is completed in one year of real time for user access purposes. So, if a child starts playing the game on their 12th birthday, the game will be completed on their 13th birthday. This means that children who play the "fike-teen" game, will be well prepared to learn and live virtually for their 7 years of teenage life because they have already experienced the life in just one year virtually.

Since a fike-teen game represents real life, there is no beginning or "end". In real life, the journey is the destination. Similarly, in the "fike-teen" game the process is the product. The purpose of the "game" is to educate teenagers about ethical/social/financial/physical consequences of unwanted pregnancy as well as the ethical/religious issues involved with abortion, etc. There will be dating tips and other helpful information so users will learn to take precautions regarding dating. Players are permitted to play "fike-Teen" at different levels, however, in order to qualify to play at a higher level, users will have hurdles, in the form of quizzes, video lessons and other methods and techniques, and only after passing these hurdles, may he/she go to the next level of a virtual relationship.

The basic concept behind social media integration with the fike-teen game is that people behave better if they know that others are watching. Thus, the players are permitted to automatically post their "fike-score" to their social homepage, as an evidence of their authenticated popularity. At the successful completion of 1 year of gaming, players will be given a certificate and they will be able to write "Fike-certified Teenager" or "Certified Fiker" or something similar, with their name and online social networking profile. During the game, players will receive interesting rewards/buttons/titles, which can be shared with their friends on social media. Users will play the game through their choice of whom they decide to "fike" with. However, in order to get to next level of fike-ability, they will have to pass through hurdles, which are the basic educational exercises associated with adolescent youths.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent any of the above-described network components, etc.

Figure 7:
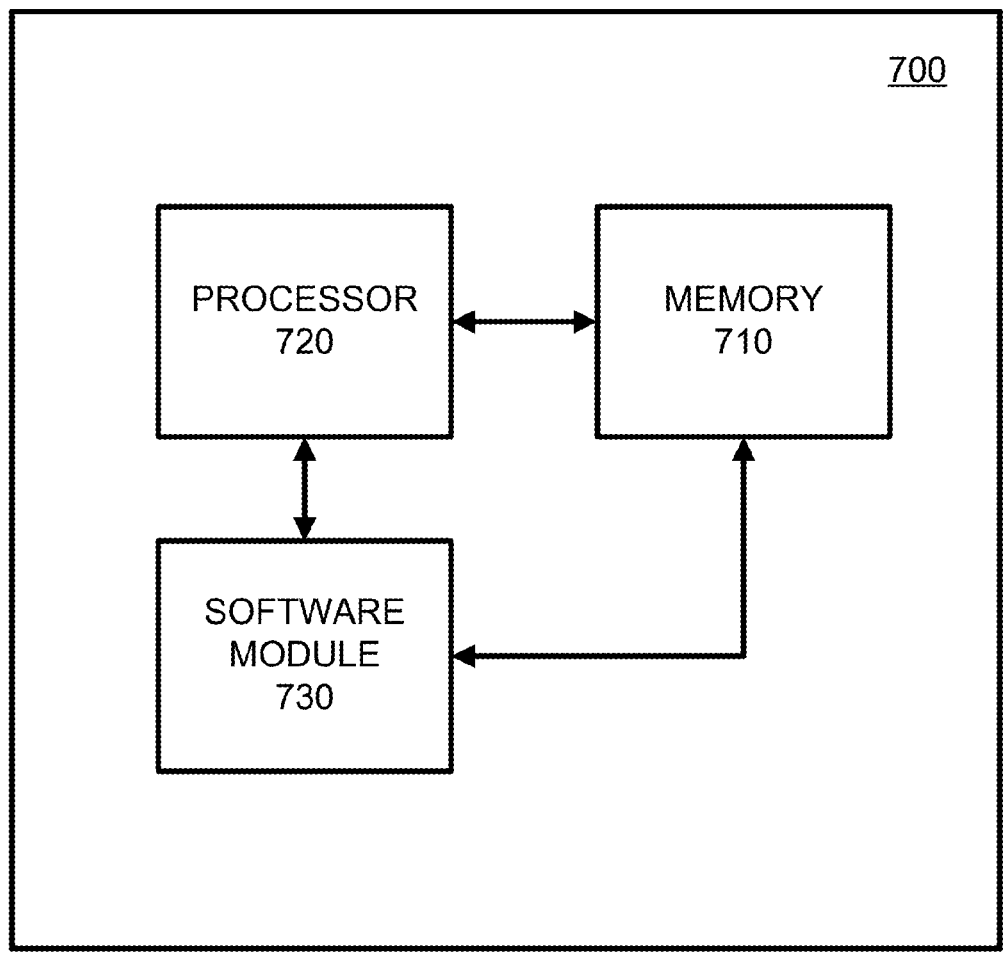
FIG. 7 illustrates an example network entity device configured to store instructions, software, and corresponding hardware for executing the same, according to example embodiments of the present application.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of FIG. 12 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   identifying a target location associated with a digital gesture performed by a user device;
   identifying the digital gesture received from the user device; receiving a digital gesture confirmation based on at least one of a current location and a previous location of the user device and a distance between at least one of the current location and the previous location and the target location associated with the digital gesture;
   applying a weight to the digital gesture responsive to receiving the digital gesture confirmation, wherein the weight applied is based on the distance between at least one of the current location and the previous location and the target location; and storing the digital gesture as a weighted function of the applied weight, wherein the weighted digital gesture is stored as part of a rating configuration.

2. The method of claim 1, wherein the digital gesture confirmation comprises at least one of a near field communication session confirmation and a geographical proximity confirmation between the user device and the target location.

3. The method of claim 1, further comprising:
receiving a radio transmitted signal at a digital gesture reception terminal comprising a receiver, the radio transmitted signal comprising the digital gesture.

4. The method of claim 1, wherein the radio transmitted signal comprises at least one of a Bluetooth low energy (BLE) signal, a near field communication (NFC) signal, a WIFI communication signal, a ZIBGEE communication signal and a short message service (SMS) signal.

5. The method of claim 1, wherein applying a weight to the digital gesture based on the digital gesture confirmation comprises applying a minimum weight to the digital gesture confirmation when a user device location is more than a threshold distance away from the target location.

6. The method of claim 1, wherein applying a weight to the digital gesture based on the digital gesture confirmation comprises applying a maximum weight to the digital gesture confirmation when a user device location is within a threshold distance away from the target location.

7. The method of claim 1, wherein the digital gesture comprises a favorable gesture at a predefined distance.

8. An apparatus comprising:
a processor configured to
identify a target location associated with a digital gesture performed by a user device,
identify the digital gesture received from the user device; and
a receiver configured to receive a digital gesture confirmation based on at least one of a current location and a previous location of the user device and a distance between at least one of the current location and the previous location and the target location associated with the digital gesture, and
wherein the processor is further configured to apply a weight to the digital gesture responsive to receiving the digital gesture confirmation wherein the weight applied is based on the distance between at least one of the current location and the previous location and the target location, and store the digital gesture as a weighted function of the applied weight, wherein the weighted digital gesture is stored as part of a rating configuration.

9. The apparatus of claim 8, wherein the digital gesture confirmation comprises at least one of a near field communication session confirmation and a geographical proximity confirmation between the user device and the target location.

10. The apparatus of claim 8, wherein the receiver is further configured to receive a radio transmitted signal at a digital gesture reception terminal comprising a receiver, the radio transmitted signal comprising the digital gesture.

11. The apparatus of claim 8, wherein the radio transmitted signal comprises at least one of a Bluetooth low energy (BLE) signal, a near field communication (NFC) signal, a WIFI communication signal, a ZIBGEE communication signal and a short message service (SMS) signal.

12. The apparatus of claim 8, wherein the weight applied to the digital gesture based on the digital gesture confirmation comprises a minimum weight being applied to the digital gesture confirmation when a user device location is more than a threshold distance away from the target location.

13. The apparatus of claim 8, wherein the weight applied to the digital gesture based on the digital gesture confirmation comprises a maximum weight being applied to the digital gesture confirmation when a user device location is within a threshold distance away from the target location.

14. The apparatus of claim 8, wherein the digital gesture comprises a favorable gesture at a predefined distance.

* * * * *